(12) United States Patent
Okada

(10) Patent No.: US 6,392,795 B2
(45) Date of Patent: May 21, 2002

(54) MICROSCOPE WITH A DYNAMIC DAMPER

(75) Inventor: Naobumi Okada, Asaka (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/842,798

(22) Filed: Apr. 27, 2001

Related U.S. Application Data

(63) Continuation of application No. 09/375,434, filed on Aug. 17, 1999, now abandoned.

(30) Foreign Application Priority Data

Aug. 28, 1998 (JP) ............................................ 10-243157
May 28, 1999 (JP) ............................................ 11-149999

(51) Int. Cl.[7] .......................... G02B 7/00; G02B 21/00; G02B 21/24
(52) U.S. Cl. ........................ 359/368; 359/824; 359/896
(58) Field of Search ................................ 359/368, 381, 359/382, 822, 823, 824, 896

(56) References Cited

U.S. PATENT DOCUMENTS 4,168,881 A * 9/1979 Rosenberger ................. 350/82
4,823,004 A    4/1989 Kaiser et al. ................. 250/306
4,927,254 A    5/1990 Kino et al. ................... 350/507
5,067,805 A   11/1991 Corle et al. .................. 359/235
5,153,428 A   10/1992 Ellis ........................... 250/234
5,260,824 A   11/1993 Okada et al. ................. 359/368
5,672,816 A    9/1997 Park et al. ..................... 73/105
5,691,806 A * 11/1997 Tokuda et al. ................. 355/72

FOREIGN PATENT DOCUMENTS

JP           3-250165         11/1991
JP           8-21483          1/1996

* cited by examiner

Primary Examiner—Jon Henry
(74) Attorney, Agent, or Firm—Kenyon & Kenyon

(57) ABSTRACT

A microscope with a dynamic damper, and an optical system including a plurality of optical elements and having an optical axis. The dynamic damper attenuates vibration of the microscope in the direction of the optical axis by using part of the plurality of optical elements as a mass displaceable in the direction of the optical axis in accordance with said vibration.

7 Claims, 7 Drawing Sheets

MICROSCOPE WITH A DYNAMIC DAMPER

This application is a continuation of application Ser. No. 09/375,434 filed Aug. 17, 1999, now abandoned.

BACKGROUND OF THE INVENTION

1. Field of the Invention

This invention relates to a microscope with a dynamic vibration absorber.

2. Description of Related Art

In a microscope of high resolving power, slight vibration will cause a great disturbance. Accordingly, measures against the vibration have been taken. For example, an air table and a rubber foot are used therefor.

The air table attenuates vibration from the floor by utilizing an air spring or the like and serves as a table for mounting a microscope. Further, there is proposed an air table in which a sensor detects vibration of the table to drive and control actuators provided between the floor and the table so that the vibration can be cancelled.

The rubber foot is arranged on the bottom surface of a microscope to prevent the microscope from becoming unsteady and to attenuate vibration transmitted from a surface on which the microscope is located. In addition, the rubber foot can reduce rolling or pitching of the whole microscope.

Furthermore we know a dynamic vibration absorber (a dynamic damper) which is a kind of means for attenuating vibration.

The dynamic vibration absorber reduces vibration by means of a force due to vibration of a mass and is divided into a passive dynamic vibration absorber and an active dynamic vibration absorber. The passive dynamic vibration absorber comprises a mass, a spring element, and a damping element. A plurality of masses, springs and/or damping elements may be used in some kinds of apparatus. The active dynamic vibration absorber uses a vibration sensor to detect vibration and drives a mass by means of an actuator to reduce the vibration. The dynamic vibration absorber is applied to various technologies such as construction and automobile industries and is disclosed in, for example, Japanese Laid-Open Patent Publication Nos. Hei 3-250165 and Hei 8-21483.

In the passive dynamic vibration absorber, the mass is secured via the spring element and the damping element to a structure whose vibration should be reduced. When the structure vibrates so that the relative displacement between the mass and the structure varies, vibration energy is consumed by the damping element between the mass and the structure, thereby attenuating the vibration.

In the active dynamic vibration absorber, the mass is secured via the actuator to a structure whose vibration should be reduced. After the vibration sensor detects vibration of the structure, the actuator drives the mass according to the detected vibration so that the vibration of the structure can be cancelled by a force of the mass.

As described above, in a microscope of high resolving power, vibration is reduced by means of an air table, a rubber foot, a dynamic vibration absorber, or the like. However, in recent years, these measures against the vibration have become insufficient.

For example, microscopes having a resolving power of 1 nm or less, such as a tunneling microscope (see U.S. Pat. No. 4,823,044) and an atomic force microscope (see U.S. Pat. Nos. 5,260,824 and 5,672,816), have been put to practical use. Further, a scanning laser microscope provides an observation image which is very clear in comparison with that of a conventional microscope. These microscopes require very strict setting environments. For example, air vibration caused by voice, noise, an air conditioner or the like will cause a deterioration of the observation image.

Further, a motor driving mechanism is incorporated in a microscope for electrical driving and is also a source of vibration. That is, when the driving mechanism operates to move a sample stage, perform focusing, or change over filters, prisms or the like, mechanical vibration is generated from the driving mechanism.

Under the circumstances, the air table is used for the measures against the vibration. The air table is to insulate a structure on the table from floor vibration and is not effective in insulating the structure from a disturbance, such as air vibration caused by voice, noise, an air conditioner or the like, and mechanical vibration generated by an electrically driven microscope itself.

The rubber foot is to prevent a microscope from being unsteady when it is installed, and to reduce rolling or pitching of the entire microscope. It does not directly contribute to reducing the vibration that varies the relative positions of a sample and an observation optical system.

The dynamic vibration absorber is used for reducing air vibration caused by voice, noise, an air conditioner or the like, and mechanical vibration generated by an electrically driven microscope itself that are applied to a structure affecting an observation image of a sample, such as an objective lens and a sample stage. That is, the dynamic vibration absorber is suitable for reducing local vibration, but has the problems that its setting place is restricted and that the microscope becomes heavy because the mass is used.

It is explained why the setting place is restricted. In the microscope, the structures whose vibration should be reduced are the sample stage and the observation optical system. In many cases, the observation optical system is supported by a cantilever-type frame. Since the cantilever-type frame has a shape that is susceptible to vibration, it is desired to reduce the vibration. However, as the observation optical system exists, the setting place of the dynamic vibration absorber is restricted. Accordingly, in the conventional microscope system, the space for incorporation the dynamic vibration absorber has not been studied.

The reason why the microscope becomes heavy due to the use of the mass is as follows: Since the passive dynamic vibration absorber has no vibration sensor, it cannot cope with a change of the structure whose vibration should be reduced, especially when the equivalent mass (mass of a physical model of a structure) of the mass is smaller than that of the structure whose vibration should be reduced. Since the frame of a microscope is highly rigid and its equivalent mass is large, a heavy mass is required. Accordingly, the microscope becomes heavy (and a large setting space is also necessary). When the microscope becomes substantially heavy, it is necessary to redesign the frame or the like.

BRIEF SUMMARY OF THE INVENTION

In an embodiment of the present invention, a microscope having an optical axis has a frame including a base arm, a column extending vertically from the base arm and an upper arm. Adynamic damper includes a fixed part coupled to the upper side of the upper arm, and a movable part supported for linear movement in the direction of the optical axis with respect to the fixed part. An optical system is coupled to the movable part, the optical system comprising a displaceable mass of the dynamic damper. Parallel light rays extend along part of the optical axis, with the dynamic damper surrounding the optical axis at the position of the parallel light rays.

The microscope may also include a sensor for detecting vibration of the fixed part, and outputting a vibration signal, an actuator for moving the movable part in a direction of the optical axis; and a controller for outputting a driving signal to move the actuator, the driving signal generated on the basis of the vibration signal so as to attenuate the vibration.

A damping member for attenuating the vibration of the movable part with respect to the fixed part may be disposed between the movable part and the fixed part. The microscope may be, for example, a laser scanning microscope or a confocal microscope. The optical system may be an ocular tube or an ocular tube, and an intermediate attachment.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

First Embodiment

Figure 1:
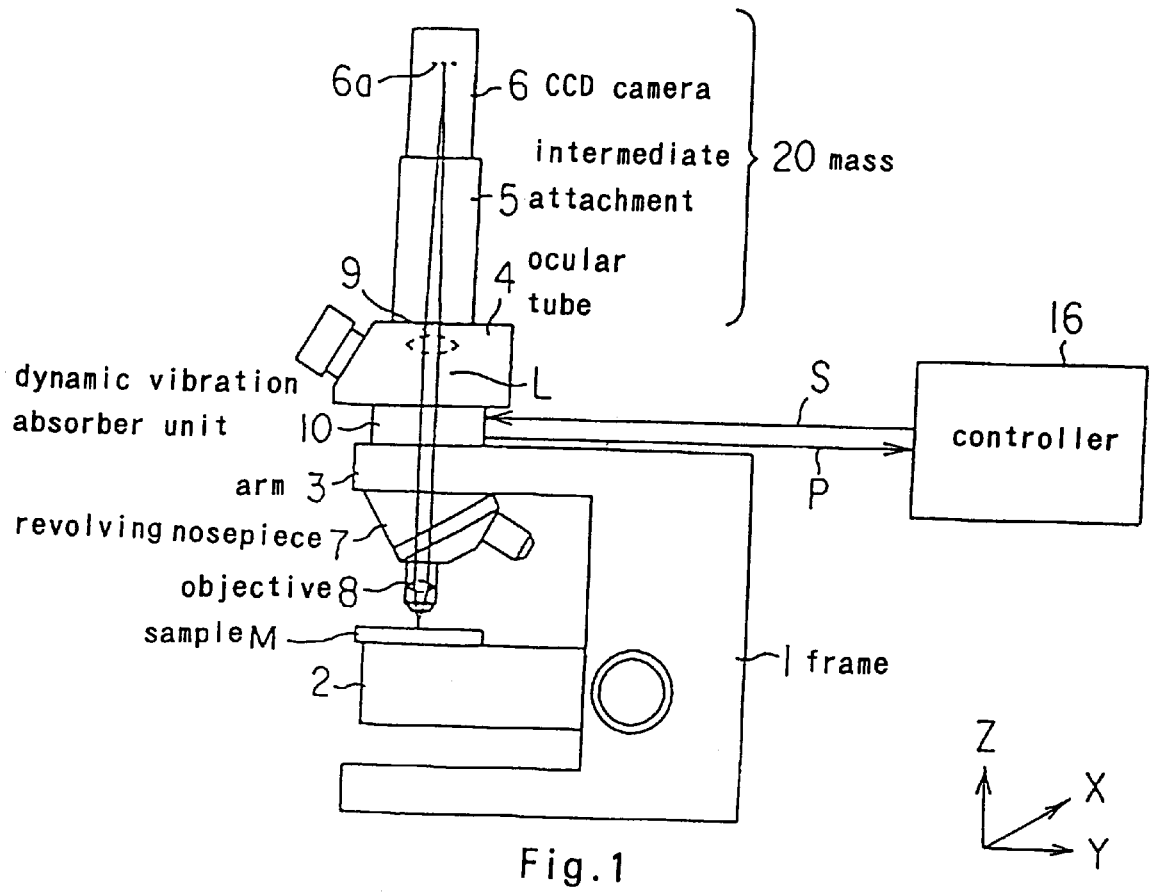
FIG. 1 is a side view of a microscope with an active dynamic vibration absorber according to a first embodiment of the present invention.

Referring to the drawings, a first embodiment of the present invention is described.

FIG. 1 shows the structure of a microscope with an active dynamic vibration absorber.

A frame 1 of the microscope is provided with a sample stage 2, on which a sample M is mounted. The frame 1 has an arm 3 projecting above the sample stage 2. Above the arm 3, there are an ocular tube 4, an intermediate attachment 5 and a CCD camera 6 which constitute an observation optical system. Mounted on a lower surface of the arm 3 is a revolving nosepiece 7 with a plurality of infinity-corrected objectives 8. The ocular tube 4 is provided with an imaging lens 9 which focuses parallel observation rays L from the objective 8 upon an image plane 6a of the CCD camera 6. The microscope is also provided with an illumination optical system for illuminating the sample M.

Figure 2:
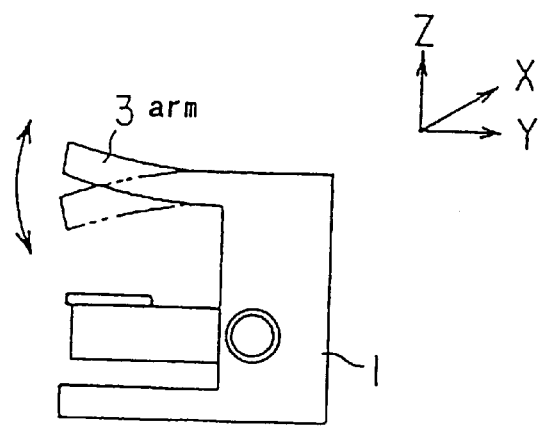
FIG. 2 is a side view of a frame of the microscope in FIG. 1.

The microscope comprises a dynamic vibration absorber unit 10 for reducing vibration of the arm 3 that is a structure whose vibration should be reduced. When the frame 1 vibrates as shown in FIG. 2, the relative positions of the observation optical system and the sample M vary because of the vibration so that an observation image will be blurred. Accordingly, it is necessary to reduce the vibration of the frame 1 by means of the dynamic vibration absorber.

The dynamic vibration absorber unit 10 is arranged between the arm 3 and microscope components: the ocular tube 4, the intermediate attachment 5 and the CCD camera 6, which constitute the observation optical system functioning as a mass 20 of the active dynamic vibration absorber.

Figure 3:
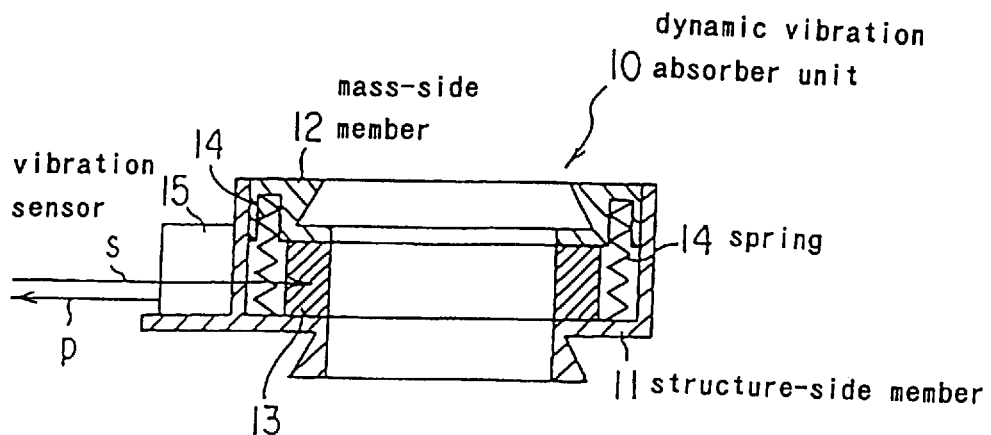
FIG. 3 is sectional view of the active dynamic vibration absorber of the microscope in FIG. 1.

FIG. 3 shows a structure of the dynamic vibration absorber unit 10.

The dynamic vibration absorber unit 10 comprises a cylindrical structure-side member 11 on the side of the structure whose vibration should be reduced; a mass-side member 12 slidably fitted into the structure-side member 11; and a piezoelectric actuator 13 and a spring 14 interposed between the structure-side member 11 and the mass-side member 12. The piezoelectric actuator 13 and the spring 14 support the ocular tube 4, the intermediate attachment 5 and the CCD camera 6. The piezoelectric actuator 13 expands and contracts in the Z-direction to drive the ocular tube 4, the intermediate attachment 5 and the CCD camera 6 that constitute the mass 20. The piezoelectric actuator 13 may be replaced with a voice coil.

On the upper surface of the mass-side member 12, there should be mounted, via a dovetail, the mass 20 comprising the ocular tube 4, the intermediate attachment 5 and the CCD camera 6. The lower surface of the structure-side member 11 is to be attached, via a dovetail, to the arm 3 that is the structure whose vibration should be reduced. Via these dovetails, the dynamic vibration absorber unit 10 can be attached to a conventional microscope system.

Further, the structure-side member 11 is provided with a vibration sensor 15 for detecting vibration of the arm 3 that is the structure whose vibration should be reduced. As the vibration sensor 15, for example, a piezoelectric acceleration sensor is used in view of its frequency band, sensitivity and size.

A vibration sensor signal p outputted from the vibration sensor 15 is inputted to a controller 16 (FIG. 1) which has the following function: in accordance with the vibration of the arm 3 represented by the vibration sensor signal p, the controller 16 operates to derive an actuator drive signal s for reducing the vibration of the arm 3 and transmits the actuator drive signal s to the piezoelectric actuator 13.

Figure 4:
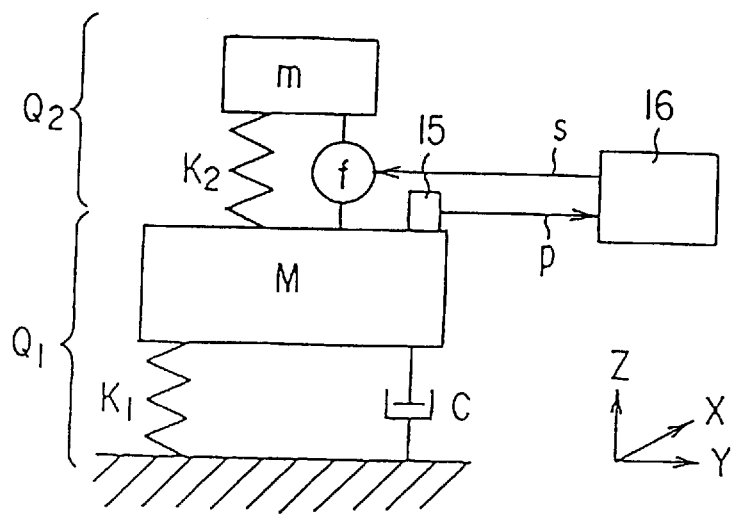
FIG. 4 is a schematic view of a physical model of the active dynamic vibration absorber in FIG. 3.

Referring to FIG. 4, a physical model of the active dynamic vibration absorber constituted as described above is explained. M represents the equivalent mass of the arm 3 that is the structure whose vibration should be reduced. K1 and C respectively denote the equivalent stiffness and equivalent damping of the arm 3. These constitute a physical model Q1 of the arm 3.

Further, m denotes the mass 20 (the ocular tube 4, the intermediate attachment 5 and the CCD camera 6), K2 a spring element of the spring 14, and f the piezoelectric actuator 13. These and the vibration sensor 15 and the controller 16 constitute a physical model Q2 of the dynamic vibration absorber.

Next, the vibration reducing operation in the microscope constituted as described above is explained.

In the arm 3 of the frame 1, vibration of the natural frequency of the arm 3 is produced by air vibration (such as wind or sound), vibration from the floor, internal mechanical vibration due to the operation of the-microscope, or the like. when the arm 3 vibrates, the relative distance between the sample stage 2 and the objective 8 varies so that the observation image will be blurred.

The vibration sensor 15 detects the vibration of the arm 3 and outputs the vibration sensor signal p, which is inputted to the controller 16. As described above, in accordance with the vibration of the arm 3 represented by the vibration sensor signal p, the controller 16 operates to derive the actuator drive signal s for reducing the vibration of the arm 3 and transmits the actuator drive signal s to the piezoelectric actuator 13.

The piezoelectric actuator 13 vibrates in the Z-direction the mass 20 comprising the ocular tube 4, the intermediate attachment 5 and the CCD camera 6 so that the force of the mass 20 can reduce the vibration of the arm 3.

Figure 5:
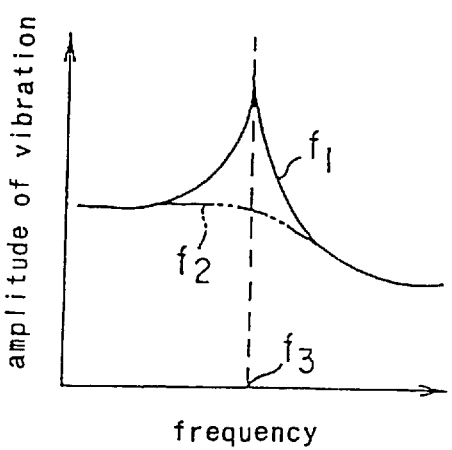
FIG. 5 is a graph of frequency response showing a vibration reducing effect of the active dynamic vibration absorber in FIG. 3.

FIG. 5 is a graph of frequency response showing a vibration reducing effect of the dynamic vibration absorber. f1 denotes the amplitude of vibration of the arm 3 without the dynamic vibration absorber, f2 the amplitude of vibration of the arm 3 with the dynamic vibration absorber, and f3 the natural frequency of the arm 3. This figure shows that resonance peak at the natural frequency can be reduced by the dynamic vibration absorber.

As described above, in the first embodiment, the dynamic vibration absorber unit 10 is arranged between the arm 3 and the mass 20 comprising the ocular tube 4, the intermediate attachment 5 and the CCD camera 6, so as to reduce the vibration of the arm 3. Accordingly, the microscope of this embodiment can be provided with the dynamic vibration absorber unit 10 without changing the structure of the microscope. Thus, the dynamic vibration absorber unit 10 can be introduced into the microscope system without restriction of its setting place and without increasing the weight of the microscope. It is also possible to arrange the dynamic vibration absorber unit 10, for example, between the arm 3 and the revolving nosepiece 7 or between the revolving nosepiece 7 and the objective 8 so as to reduce the vibration of the revolving nosepiece 7 or the objective 8.

This embodiment is also advantageous in that the dynamic vibration absorber unit 10 does not affect the observation image since the observation rays L passing through the dynamic vibration absorber unit 10 between the arm 3 and the ocular tube 4 are parallel rays.

Second Embodiment

Referring to the drawings, a second embodiment of the present invention is described. The same elements as those shown in FIG. 1 are assigned the same reference numerals and characters and their descriptions are omitted.

Figure 6:
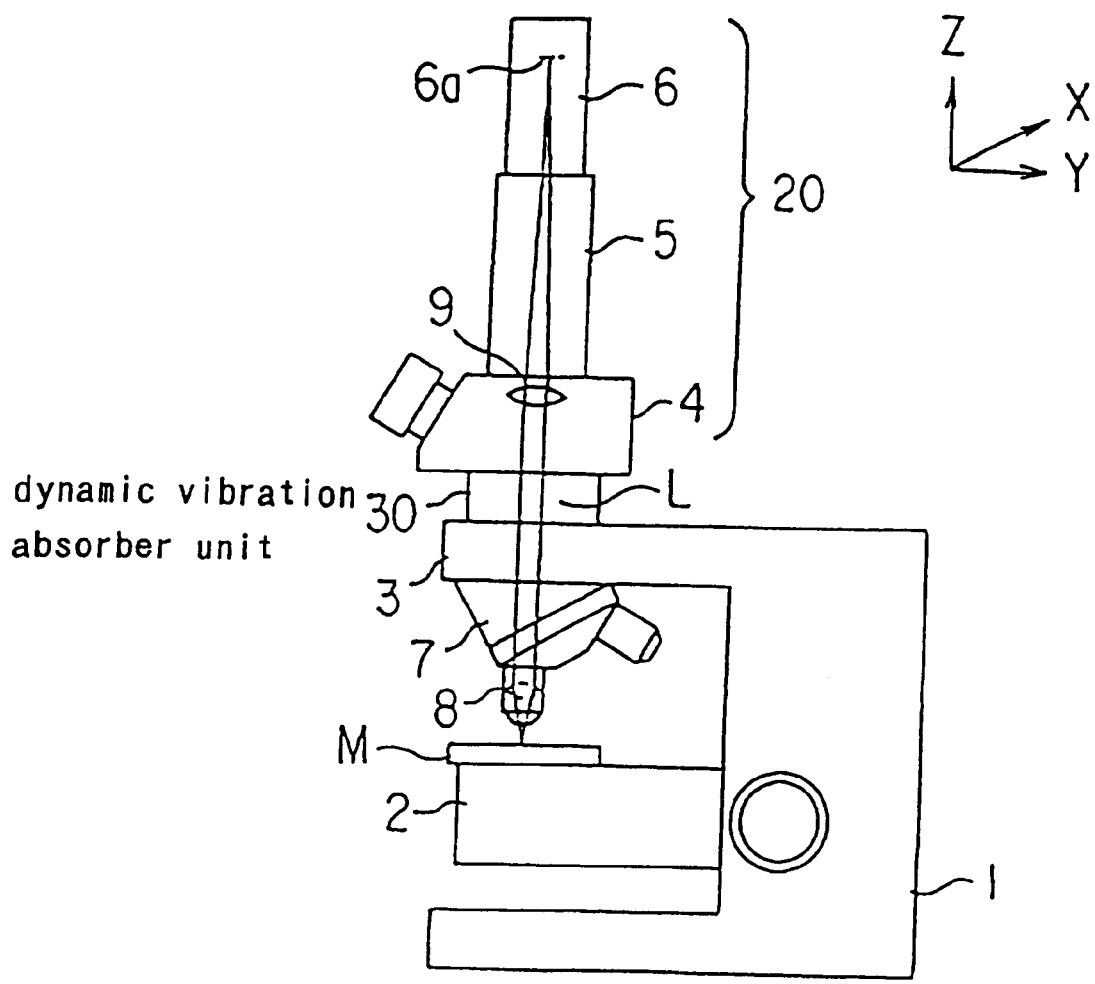
FIG. 6 is a side view of a microscope with a passive dynamic vibration absorber according to a second embodiment of the present invention.

FIG. 6 shows the structure of a microscope with a passive dynamic vibration absorber.

The microscope is provided with a dynamic vibration absorber unit 30 for reducing vibration of an arm 3 which is a structure whose vibration should be reduced. The dynamic vibration absorber-unit 30 is arranged between the arm 3 and a mass 20 of the dynamic vibration absorber, the mass 20 comprising an ocular tube 4, an intermediate attachment 5 and a CCD camera 6 that constitute an observation optical system.

Figure 7:
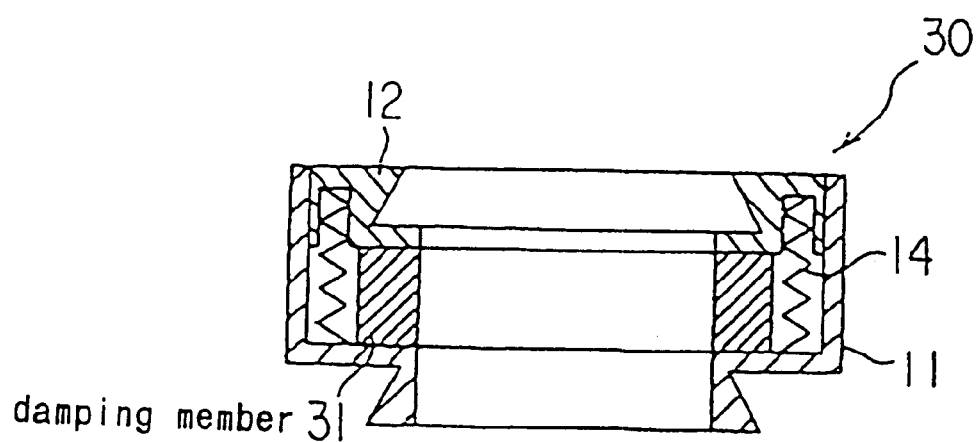
FIG. 7 a sectional view of the passive dynamic vibration absorber of the microscope in FIG. 6.

FIG. 7 shows a structure of the dynamic vibration absorber unit 30.

The dynamic vibration absorber unit 30 comprises a cylindrical structure-side member 11 on the side of the structure whose vibration should be reduced; a mass-side member 12 slidably fitted into the structure-side member 11; and a damping member 31 and a spring 14 interposed between the structure-side member 11 and the mass-side member 12. The damping member 31 and the spring 14 support the ocular tube 4, the intermediate attachment 5 and the CCD camera 6.

The damping member 31 has a function of expanding and contracting in the Z-direction in accordance with vibration of the ocular tube 4, the intermediate attachment 5 and the CCD camera 6 so as to reduce their vibration. The damping member 31 is made of, for example, silicone rubber or urethane rubber and has both mechanical properties and spring properties. If the damping member 31 and the spring 14 are exchangeable with those having different characteristics, the characteristics of the dynamic vibration absorber unit 30 can be varied in order to cope with the exchange of the ocular tube 4, the intermediate attachment 5 and the CCD camera 6.

The natural frequency of the dynamic vibration absorber is determined by the damping member 31, the spring 14 and the mass 20. When this natural frequency is identical with the natural frequency of the arm 3 which is the structure whose vibration should be reduced, the effect of reducing the vibration is large. Accordingly, the damping member 31, the spring 14 and the mass 20 are selected so that the natural frequency of the dynamic vibration absorber is identical with that of the arm 3.

The spring 14 is exchangeable or adjustable so that the dynamic vibration absorber can be adjusted when the ocular tube 4, the intermediate attachment 5 and the CCD camera 6, which function as the mass 20, are exchanged.

Figure 8:
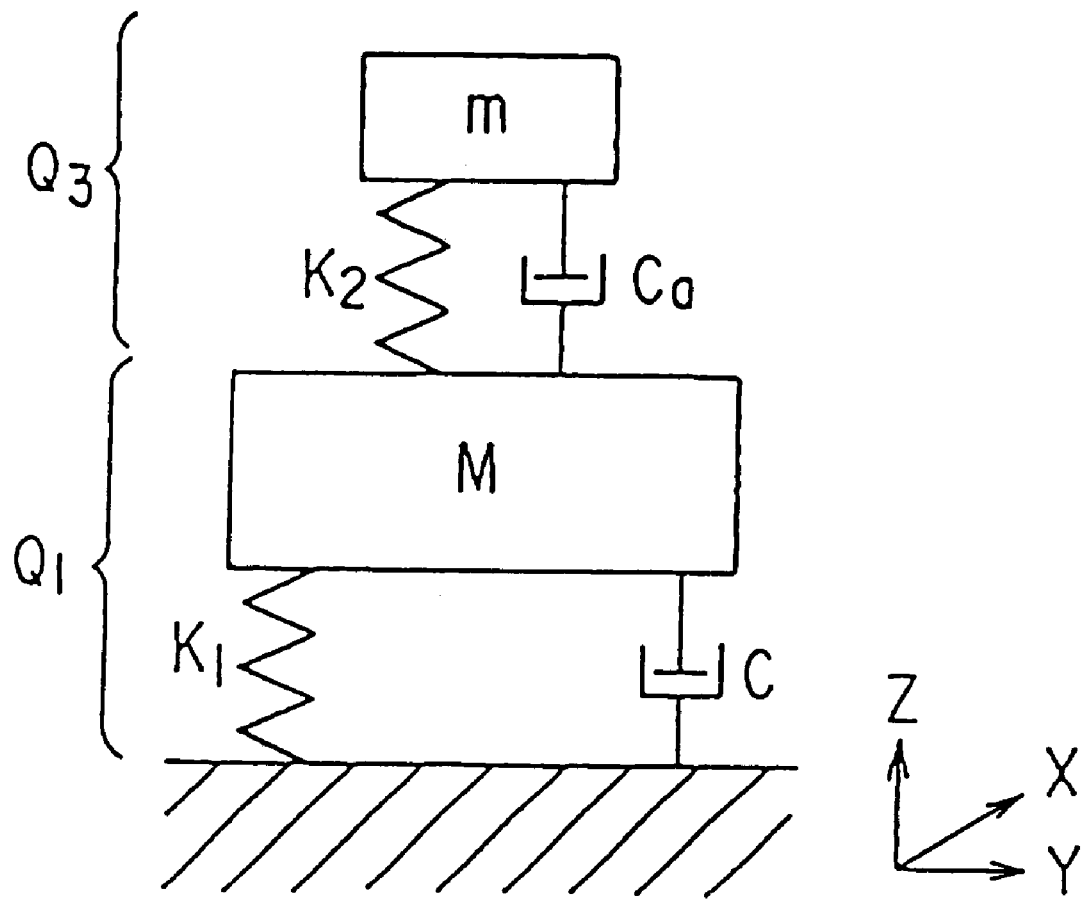
FIG. 8 is a schematic view of a physical model of the passive dynamic vibration absorber in FIG. 7.

FIG. 8 shows a physical model of the active dynamic vibration model. M represents the equivalent mass of the arm 3 that is the structure whose vibration should be reduced. K1 and C respectively denote the equivalent stiffness and equivalent damping of the arm 3. These constitute a physical model Q1 of the aria 3.

Further, m denotes the mass 20 (the ocular tube 4, the intermediate attachment 5 and the CCD camera 6), K2 a—spring element of the spring 14, and Ca the damping member 31. These constitute a physical model Q3 of the dynamic vibration absorber.

Next, the vibration reducing operation in the microscope constituted as, described above is explained.

In the arm 3 of the frame 1, vibration of the natural frequency of the arm 3 is produced by air vibration (such as wind or sound), vibration from the floor, internal mechanical vibration due to the operation of the microscope, or the like. When the arm 3 vibrates, the relative distance between a sample stage 2 and an objective 8 varies so that the observation image will be blurred.

When the arm 3 vibrates, then the mass 20 (the ocular tube 4, the intermediate attachment 5 and the CCD camera 6) above the arm 3 also vibrates and the damping member, 31 and the spring 14 arranged between the arm 3 and the mass 20 expand and contract. At this time, vibration energy is converted into thermal energy. Thus, the vibration energy is consumed by the expansion and contraction of the damping member 31 so that the vibration of the arts 3 is reduced.

As described above, in the second embodiment, the dynamic vibration absorber unit 30 is arranged between the arm 3 and the mass 20 comprising the ocular tube 4, the intermediate attachment 5 and the CCD camera 6, so as to reduce the vibration of the arm 3. Accordingly, just like in the first embodiment, the microscope of this embodiment can be provided with the dynamic vibration absorber unit 30 without changing the structure of the microscope. Thus, the dynamic vibration absorber unit 30 can be introduced into the microscope system without restriction of its setting place and without increasing the weight of the microscope. It is also possible to arrange the dynamic vibration absorber unit 30, for example, between the arm 3 and a revolving nosepiece 7 or between the revolving nosepiece 7 and the objective 8 so as to reduce the vibration of the revolving nosepiece 7 or the objective 8.

Since this embodiment does not require the controller 16 of the first embodiment, the setting space of the dynamic vibration absorber unit 30 is less restricted than in the first embodiment.

Further, the dynamic vibration absorber unit 30 does not affect the observation image since the observation rays L passing through the dynamic vibration absorber unit 30 between the arm 3 and the ocular tube, 4 are parallel rays.

Third Embodiment

Next, a third embodiment of the present invention is explained.

Figure 9:
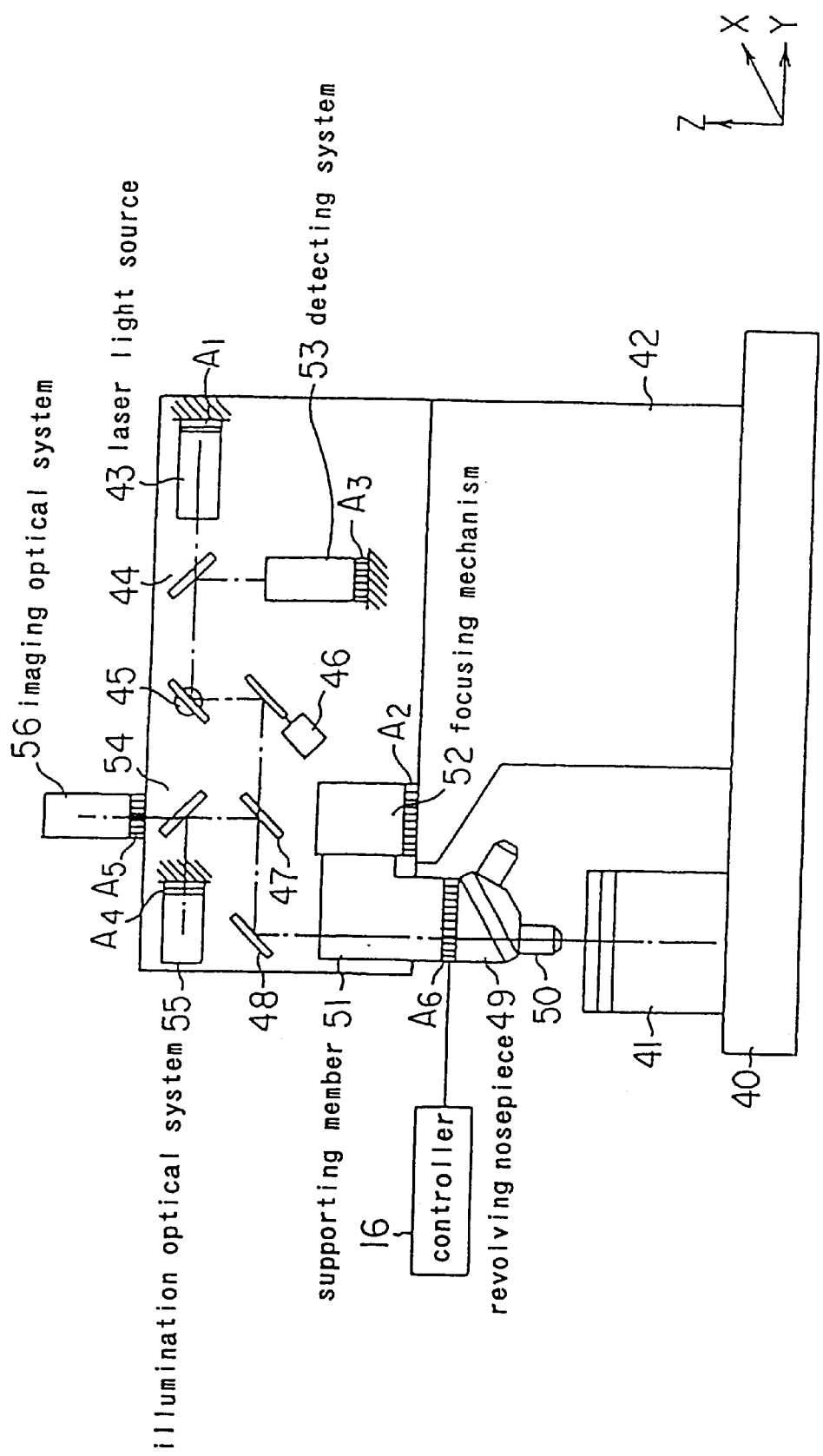
FIG. 9 is a side view of a microscope with dynamic vibration absorbers according to a third embodiment of the present invention.

FIG. 9 shows the structure of a laser scanning microscope (LSM) with dynamic vibration absorbers.

The LSM is a microscope for visualizing optical information of a sample, for example, a three-dimensional image of the sample by irradiating a laser beam to a desired position of the sample and detecting the beam reflected from the sample. Such an LSM is described in, for example, U.S. Pat. No. 5,153,428, the contents of which is hereby incorporated by reference.

A sample stage 41 and a frame 42 are provided on a base 40. A laser light source 43 is fixed to the frame 42. Arranged on the optical path of the laser beam emitted from the laser light source 43 are a half mirror 44, galvanomirrors 45 and 46 for scanning the laser beam in the directions of the X- and Y-axes which are perpendicular to each other, a half mirror 47 and a mirror 48. Further, a revolving nosepiece 49 and an objective 50 attached to the revolving nosepiece 49 are arranged on the optical path of the laser beam. The revolving nosepiece 49 is coupled to a focusing mechanism 52 via a supporting member 51 and the position of the revolving nosepiece 49 can be adjusted in the Z-direction by the focusing mechanism 52. An imaging lens (not shown) is arranged between the objective 50 and the mirror 48 to form an image of a sample M at a detecting system 53. The imaging lens and a CCD camera arranged in the detecting system 53 constitute an observation optical system.

A half mirror 54 is arranged on a branch optical path of the half mirror 47. An illumination optical system 55 of an optical microscope is located on a branch optical path of the half mirror 47, and an imaging optical system 56 of the optical microscope is positioned on another branch optical path. The illumination optical system 55 of the optical microscope comprises a light source, a filter and the like.

Of the above components, the laser light source 43, the focusing mechanism 52, the detecting system 53, and the illumination optical system 55 and imaging optical system 56 of the optical microscope are fixed to the frame 42 via dynamic vibration absorber units A1 to A5, respectively. Further, the revolving nosepiece 49 is fixed to the supporting member 51 via a dynamic vibration absorber unit A6.

The laser light source 43, the revolving nosepiece 49, the focusing mechanism 52, the detecting system 53, and the illumination optical system 55 and imaging optical system 56 of the optical microscope must be arranged such that they vibrate in directions that will not affect the optical microscope. That is, they are supported by the respective dynamic vibration absorber units A1 to A6 such that they can vibrate in the directions of the optical paths. The laser light source 43 and the illumination optical system 55 of the optical microscope are supported in the Y-direction, and the revolving nosepiece 49, the focusing mechanism 52, the detecting system 53, and the imaging optical system 56 of the optical microscope are supported in the Z-direction. Although the detecting system 53 is oriented in the Z-direction in the figure, it can be rotated together with the half mirror 44 around the Y-axis, thereby securing its freedom in designing the microscope.

The dynamic vibration absorber units A1 to A5 are passive dynamic vibration absorber units and constructed in the same way as the second embodiment. The damping member 31 converts vibration energy into thermal energy to reduce the vibration of the structure whose vibration should be reduced.

The dynamic vibration absorber unit A6 is an active dynamic vibration absorber unit and coupled to a controller 16. It is designed in the same way as the first embodiment. The vibration sensor 15 detects the vibration of the structure whose vibration should be reduced, and the controller 16 drives the piezoelectric actuator 13 in accordance with the vibration of the structure to vibrate the mass 20 of the dynamic vibration absorber, so that the force of the mass 20 can reduce the vibration of the structure.

The dynamic vibration absorber units A1 to A5 may be active and the dynamic vibration absorber unit A6 may be passive.

Now, the vibration reducing operation in the microscope constituted as described above is explained.

Air vibration, such as wind or sound, causes the microscope to vibrate. Vibration from the floor is transmitted by the frame 42 to produce vibration of the microscope. Further, an inner vibration source, such as the galvanomirrors 45 and 46 or the focusing mechanism 52, causes vibrations of the frame 42, the focusing mechanism 52 and the revolving nosepiece 49. Because of these vibrations, the relative displacement between the objective 50 and the sample M varies to cause noise in an observation image.

In such a case, the dynamic vibration absorber comprising the revolving nosepiece 49, the dynamic vibration absorber unit A6 and the controller 16 operates as follows: When the supporting member 51 vibrates, the vibration sensor signal p outputted from the vibration sensor 15 incorporated in the dynamic vibration absorber unit A6 varies. In accordance with the variation of the signal p, the controller 16 operates to derive the actuator drive signal s for reducing the vibration of the supporting member 5 and transmits the actuator drive signal s to the piezoelectric actuator 13. The piezoelectric actuator 13 drives the revolving nosepiece 49 functioning as the mass, and its force is transmitted to the supporting member 51 to reduce the vibration of the supporting member 51.

Driving the revolving nosepiece 49 supporting the objective 50 results in the change of the focusing position.

However, the dynamic vibration absorber unit A6 drives the revolving nosepiece 49 in such a manner that the vibration of the supporting member 51 is cancelled by the force due to the vibration of the revolving nosepiece 49. Specifically, when the supporting member 51 moves to displace the revolving nosepiece 49 away from the focusing position, the dynamic vibration absorber unit A6 drives the revolving nosepiece 49 so that the revolving nosepiece 49 approaches the focusing position. Thus, by setting the gain in the controller such that the amplitude of vibration of the piezoelectric actuator 13 does not exceed the amplitude of vibration of the supporting member 51, the revolving nosepiece 49 is driven so as to restrict the change of the focusing position due to the vibration of the supporting member 51. As a result, the vibration of the supporting member 51 is reduced.

Further, the laser light source 43, the focusing mechanism 52, the detecting system 53, and the illumination optical system 55 and imaging optical system 56 of the optical microscope serve to reduce the vibration of the frame 42 by means of the vibration reducing function of the respective dynamic vibration absorber units A1 to A5. In the case of the laser light source 43 and the illumination optical system 55 of the optical microscope, the vibration in the Y-direction is reduced. With respect to the revolving nosepiece 49, the focusing mechanism 52, the detecting system 53, and the imaging optical system 56 of the optical microscope, the vibration in the Z-direction is reduced. The detecting system 53 is rotatable about the Y-axis and in accordance with its fixed position, its vibration can be reduced.

As explained above, in the third embodiment, the laser light source 43, the focusing mechanism 52, the detecting system 53, and the illumination optical system 55 and imaging optical system 56 of the optical microscope are supported by the frame 42 via the respective dynamic vibration absorber units A1 to A5. Further, the revolving nosepiece 49 is supported by the supporting member 51 via the dynamic vibration absorber unit A1. Accordingly, the vibration of the laser light source 43 and the illumination optical system 55 of the optical microscope in the Y-direction can be reduced, and the vibration of the revolving nosepiece 49, the focusing mechanism 52, the detecting system 53, and the imaging optical system 56 of the optical microscope in the Z-direction can be reduced. In other words, this embodiment can reduce plural modes of vibration.

Fourth Embodiment

Figure 10:
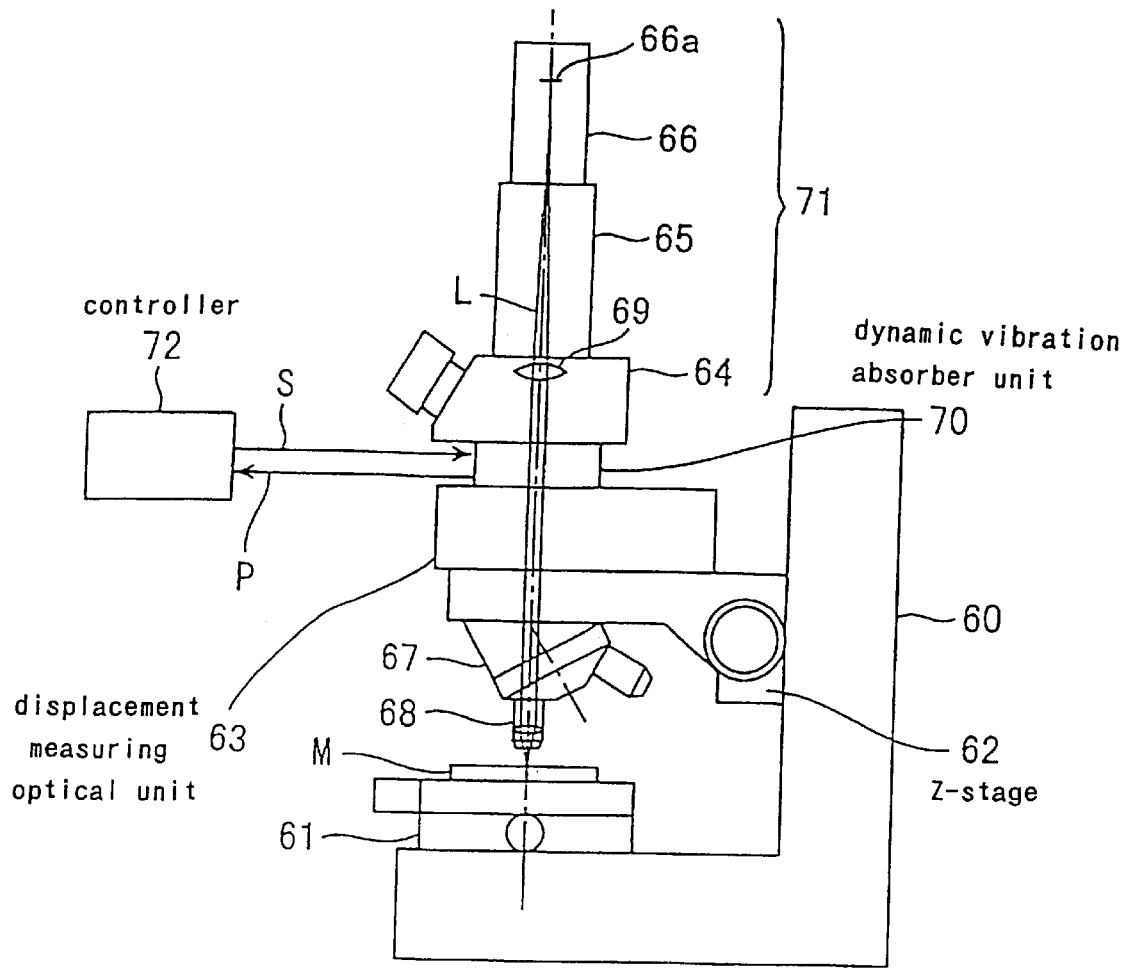
FIG. 10 is a side view of a measuring microscope with an active dynamic vibration absorber according to a fourth embodiment of the present invention.

With reference to FIG. 10, a fourth embodiment of the present invention is described.

FIG. 10 shows the structure of a measuring microscope with an active dynamic vibration absorber.

The measuring microscope measures the shape of a sample M which has a rough surface. An XY-stage 61 is provided on a base of an L-shaped frame 60, and the sample M is mounted on the XY stage 61.

A Z-stage 62 extending over the XY-stage 61 is slidably mounted on a vertical portion of the frame 60: The Z-stage 62 is provided on its upper surface with a displacement measuring optical system 63, above which there is an observation optical system comprising an ocular tube 64, an intermediate attachment 65 and a CCD camera 66. The Z-stage 62 is also provided on its lower surface with a revolving nosepiece 67, to which an objective 68 is mounted.

The displacement measuring optical system 63 has a function of measuring a minute displacement of the surface of the sample M in the direction of the Z-axis. The ocular tube 64 is provided with an imaging lens 69 for converging, on the image plane of the CCD camera 66, parallel rays of an observation light beam L from the objective 68.

The displacement measuring optical system 63, the ocular tube 64, the intermediate attachment 65 and the CCD camera 66 are moved in the direction of the optical axis (Z-direction) by driving the Z-stage 62.

The displacement measuring optical system has a light source for illuminating the sample M, and a detector for detecting light reflected from the sample M.

The detector outputs a signal on the basis of quantity of the reflected light. The signal is used for forming the shape of the sample.

The XY-stage 61 and the Z-stage 62 incorporate respective displacement scales such as an optical scale or a magnetic scale. When the XY-stage 61 and the Z-stage 62 move, the displacement scales detect respective amounts of movement, which are displayed in a displacement display. Thus, by moving the XY-stage 61 and the Z-stage 62 to change the observation position of the sample M, the observer can read the distance between the observation positions from the displacement display.

In the measuring microscope, when the frame 60 or the Z-stage 62 vibrates, the relative displacement between the objective 68 and the sample M also vibrates so that a vibration component is added to the result of measurement of the sample M. Accordingly, it is necessary to reduce the vibration of the frame 60 or the Z-stage 62 by means of an active dynamic vibration absorber unit 70.

The active dynamic vibration absorber unit 70 is arranged between the displacement measuring optical system 63 on the Z-stage 62 and microscope components: the ocular tube 64, the intermediate attachment 65 and the CCD camera 66, which constitute an observation optical system functioning as a mass 71 of the active dynamic-vibration absorber.

The dynamic vibration absorber unit 70 has the same structure as that of the dynamic vibration absorber unit 10 shown in FIG. 3 and its detailed description is omitted. A controller 72 is coupled to the dynamic vibration absorber unit 70. The vibration sensor signal p outputted from the vibration sensor 15 and representing the vibration of the Z-stage 62 is inputted to the controller 72. The controller 72 has the following function: in accordance with the vibration of the Z-stage 62, the controller 72 operates to derive an actuator drive signal s for reducing the vibration of the Z-stage 62 and transmits the actuator drive signal s to the piezoelectric actuator 13 of the dynamic vibration absorber unit 70.

Next, the vibration reducing operation in the microscope constituted as described above is explained.

The Z-stage 62 is vibrated by air vibration (such as wind or sound), vibration from the floor, internal mechanical vibration die to the operation of the microscope, or the like. When the Z-stage 62 vibrates, the relative distance between the XY-stage 61 and the objective 68 varies so that there will be an error in the result of displacement measuring.

The vibration sensor 15 detects the vibration of the Z-stage 62 and outputs the vibration sensor signal p, which is inputted to the controller 72. As described above, in accordance with the vibration of the Z-stage 62 represented by the vibration sensor signal p, the controller 72 operates to derive the actuator drive signal s for reducing the vibration of the Z-stage 62 and transmits the actuator drive signal s to the piezoelectric actuator 13.

The piezoelectric actuator 13 vibrates in the Z-direction the mass 71 comprising the ocular tube 64, the intermediate attachment 65 and the CCD camera 66 so that the force of the mass 71 can reduce the vibration of the Z-stage 62.

As described above, in the fourth embodiment, the dynamic vibration absorber unit 70 is arranged between the displacement measuring optical system 63 on the Z-stage 62 and the mass 71 comprising the ocular tube 64, the intermediate attachment 65 and the CCD camera 66. In accordance with the vibration of the Z-stage 62, the mass 71 is vibrated to reduce the vibration of the Z-stage 62. As a result, displacement due to the vibration can be prevented from being added to the measurement of the sample M.

Further, just like in the first embodiment, the measuring microscope of this embodiment can be provided with the dynamic vibration absorber unit 70 without changing the structure of the microscope. Thus, the dynamic vibration absorber unit 70 can be introduced into the microscope system without restriction of its setting place and without increasing the weight of the microscope. It is also possible to arrange the dynamic vibration absorber unit 70, for example, between the ocular tube 64 and the intermediate attachment 65 or between the intermediate attachment 65 and the CCD camera 66 so as to reduce the vibration of the intermediate attachment 65 or the CCD camera 66.

Moreover, the dynamic vibration absorber unit 70 does not affect the observation image since the observation light beam L passing through the dynamic vibration absorber unit 10 between the Z-stage 62 and the ocular tube 64 comprises parallel rays.

Fifth Embodiment

Figure 11:
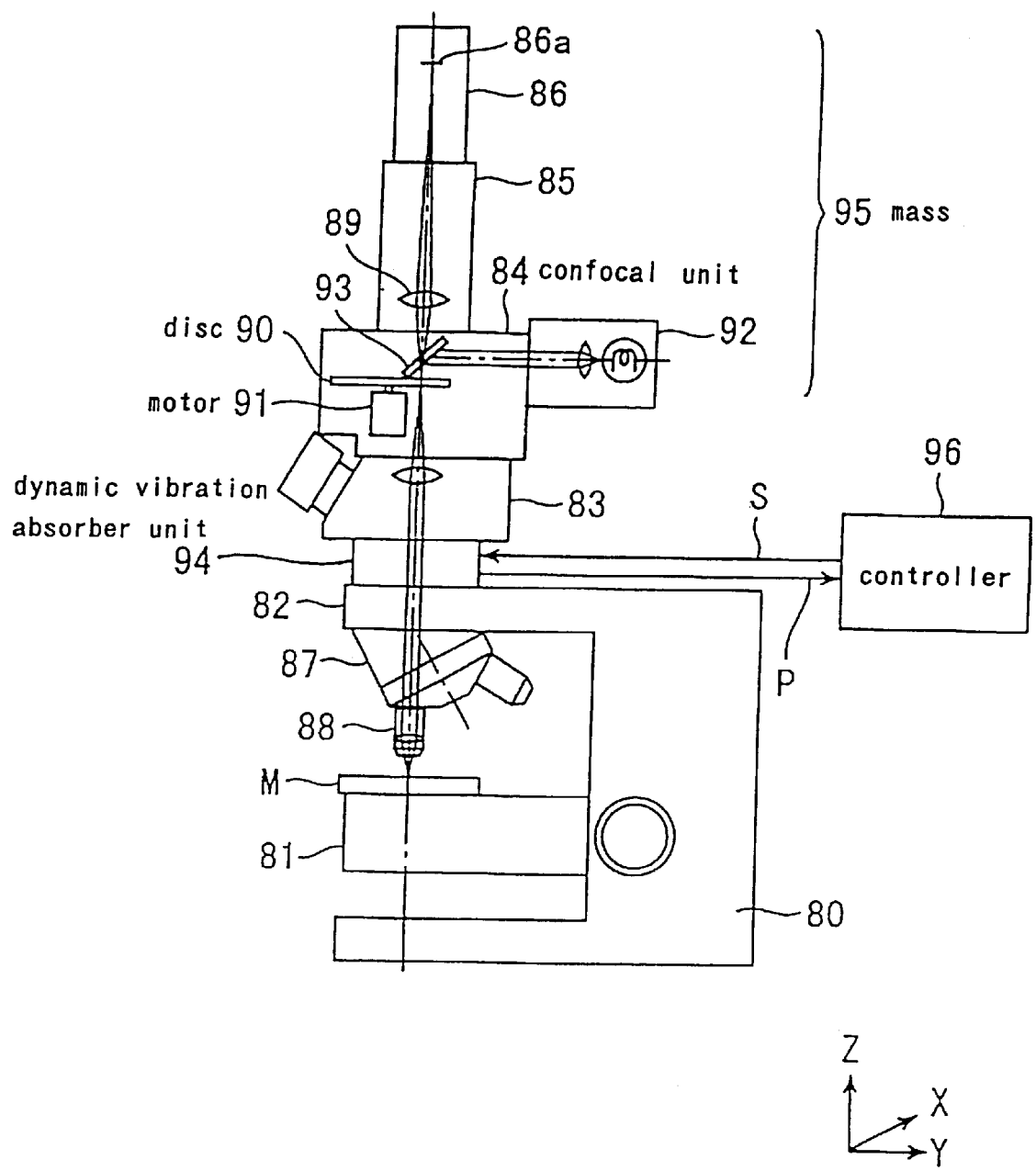
FIG. 11 is a side view of a confocal microscope with an active dynamic vibration absorber according to a fifth embodiment of the present invention.

Referring to FIG. 11, a fifth embodiment of the present invention is described.

This embodiment relates to a confocal microscope. Such a confocal microscope is described in, for example, U.S. Pat. Nos. 4,927,254 and 5,067,805, these contents of which are hereby incorporated by reference.

FIG. 11 shows the structure of a confocal microscope with an active dynamic vibration absorber.

A frame 80 of the confocal microscope is provided with a sample stage 81, on which a sample M is mounted.

Over the sample stage 81, an arm 82 protrudes from the frame 80. Above the arm 82, there are an ocular tube 83, a confocal unit 84, an intermediate attachment 85 and a CCD camera 86 that constitute an observation optical system. Mounted on a lower surface of the arm 82 is a revolving nosepiece 87 with an objective 88.

The intermediate attachment 85 is provided with an imaging lens 89 for converging, on an image plane 86a of the CCD camera 86, parallel rays of an observation light beam L from the objective 88.

The confocal unit 84 comprises a disc 90 having randomly arranged pinholes, and a motor 91 for rotating the disc 90.

An illumination optical system 92 is attached to the confocal unit 84. Illumination light emitted from the illumination optical system 92 is reflected by a mirror 93 in the confocal unit 84 to illuminate the sample M.

In the confocal microscope, when the rotating disc 90 vibrates the arm 82 of the frame 80, the relative displacement between the objective 88 and the sample M varies so that an observation image of the sample M will be blurred. Further, the confocal microscope is also used for three-dimensional measuring since it has a high resolving power. However, such vibration will substantially deteriorate its performance. Accordingly, it is necessary to use an active dynamic vibration absorber unit 94 for reducing the vibration of the frame 80. The dynamic vibration absorber unit 94 is arranged between the arm 82 of the frame 80 and microscope components: the ocular tube 83, the confocal unit 84, the intermediate attachment 85 and the CCD camera 86 that constitute the observation optical system functioning a mass 95 of the active-dynamic vibration absorber.

The dynamic vibration absorber unit 94 has the same structure as that of the dynamic vibration absorber unit 10 shown in FIG. 3 and its detailed description is omitted. A controller 96 is coupled to the dynamic vibration absorber unit 94. The vibration sensor signal p outputted from the vibration sensor 15 and representing the vibration of the frame 80 is inputted to the controller 96. The controller 96 has the following function: in accordance with the vibration of the frame 80, the controller 96 operates to derive an actuator drive signal s for reducing the vibration of the frame 80 and transmits the actuator drive signal s to the piezoelectric actuator 13 of the dynamic vibration absorber unit 94.

Next, the vibration reducing operation in the microscope constituted as described above is explained.

The frame 80 is vibrated by air vibration (such as wind or sound), vibration from the floor, internal mechanical vibration due to the operation of the confocal microscope, vibration due to the rotating disc 90 and the motor 91, or the like. When the frame 80 vibrates, the relative distance between the XY-stage 61 and the objective 68 varies so that the observation image will be blurred.

The vibration sensor 15 detects the vibration of the frame 80 and outputs the vibration sensor signal p, which is inputted to the controller 96. As described above, in accordance with the vibration of the frame 80 represented by the vibration sensor signal p, the controller 96 operates to derive the actuator drive signal s for reducing the vibration of the frame 80 and transmits the actuator drive signal s to the piezoelectric actuator 13.

The piezoelectric actuator 13 vibrates in the Z-direction the mass 95 comprising the ocular tube 83, the confocal unit 84, the intermediate attachment 85 and the CCD camera 86 so that the force of the mass 95 can reduce the vibration of the, frame 80.

As described above, in the fifth embodiment, the dynamic vibration absorber unit 94 is arranged between the frame 80 and the mass 95 comprising the ocular tube 83, the confocal unit 84, the intermediate attachment 85 and the CCD camera 86. In accordance with the vibration of the frame 80, the mass 95 is vibrated to reduce the vibration of the frame 80. As a result, it is possible to reduce a blur and axial displacement of an observation image of the sample M so that a good confocal image can be observed or three-dimensional measuring can be made.

What is claimed:

1. A microscope having an optical axis comprising:
    a frame including a base arm, a column extending vertically from said base arm and an upper arm;
    a dynamic damper including:
        a fixed part coupled to the upper side of said upper arm, and a movable part supported for linear movement in the direction of said optical axis with respect to said fixed part;
        an optical system coupled to said movable part, said optical system comprising a displaceable mass of said dynamic damper; and
        parallel light rays extending along part of said optical axis, said dynamic damper surrounding said optical axis at the position of said parallel light rays.

2. The microscope according to claim 1, further comprising:
- a sensor for detecting vibration of said fixed part, and outputting a vibration signal;
- an actuator for moving said movable part in a direction of said optical axis; and
- a controller for outputting a driving signal to move said actuator, said driving signal generated on the basis of said vibration signal so as to attenuate said vibration.

3. The microscope according to claim 1, further comprising:
- a damping member for attenuating said vibration of said movable part with respect to said fixed part, said damping member disposed between said movable part and said fixed part.

4. The microscope according to claim 1, wherein the microscope is a laser scanning microscope.

5. The microscope according to claim 1, wherein the microscope is a confocal microscope.

6. The microscope according to claim 1, wherein said optical system comprises an ocular tube.

7. The microscope according to claim 1, wherein said optical system comprises an ocular tube, and an intermediate attachment.

* * * * *